UNITED STATES PATENT OFFICE.

CONRAD POPPENHUSEN AND LUDWIG HELD, OF BROOKLYN, NEW YORK.

IMPROVEMENT IN DEVULCANIZING INDIA-RUBBER.

Specification forming part of Letters Patent No. 17,295, dated May 12, 1857; antedated April 1, 1857.

*To all whom it may concern:*

Be it known that we, CONRAD POPPENHUSEN and LUDWIG HELD, M. D., both of the city of Brooklyn, in Kings county, State of New York, have invented a new and improved mode of converting old vulcanized or metallic india-rubber, gutta-percha, or allied gums or their compounds into a plastic substance which may be used again as a substitute to said natural gums; and we do hereby declare that the following is a full and exact description of the materials and operations which we apply.

The nature of our invention consists in conducting dry ammoniacal gas into a mixture of the aforesaid ground vulcanized gums with liquids which are known to be solvents of the native gums, by which treatment the mixture is converted into a gelatinous substance, which, after evaporation of the volatile solvent, is perfectly plastic, and may be worked and used like the native gums.

In order to give a clear understanding of the process invented and used by us, we will proceed to describe the full course of the operations.

Old vulcanized rubber, gutta-percha, or similar gum, cut or ground to the smallest possible particles, is in a suitable vessel immersed into any such votatile liquid as is known to be a solvent of the native gums. As such solvents are generally considered the essential oils, the liquid carbo-hydrogens obtained from the dry distillation of organic bodies and bituminous coal—for instance, benzole, naphtha, natural or artificial, caoutchouc-oil; further, sulphuric ether, sulphuret of carbon. Oil of turpentine may be considered as the most economical solvent. The quantity of the liquid must be sufficient to cover the gum, which has to remain in the liquid till it becomes soft and brittle, or till it is thoroughly penetrated by the solvent used. This requires less time with lightly-vulcanized and very pure rubber or gum than with strong and very impure. Then it is ready for the following treatment: We heat in a retort a mixture of powdered sal-ammoniac or sulphate of ammonia and lime, all in a dry state, and conduct the dry gaseous ammonia generated by means of a pipe to near the bottom of the vessel containing the softened gum and solvent. The dry gas is readily absorbed, the gum swells up and forms at last, by the aid of constant stirring and continued introduction of the gas, with the solvent, a homogeneous gelatinous, rather viscid, mass. To bring the softened gum to this state requires from one-half to two or more hours' time, according to the speed with which the gas is generated. When no more gas is absorbed by the mixture the operation can be considered as finished.

The product obtained may be applied for practical purposes in the same way as usually solutions of the natural gum mixed with sulphur, &c., are used; or the excess of the solvent may be evaporated on the air till the mass has obtained the desired degree of consistency and plasticity, and then worked as the undissolved caoutchouc or gutta-percha are worked in their respective factories.

We do not claim the treating vulcanized india-rubber, gutta-percha, and allied gums or their compounds with any solvents of the native gums alone, as their effect on such vulcanized gums is well known; but

What we claim as our invention, and desire to secure by Letters Patent, is—

The process above described of rendering vulcanized india-rubber, gutta-percha, or allied gums or their compounds soluble and plastic by the joint action of the solvents above mentioned and dry ammonia-gas.

C. POPPENHUSEN.
LUDWIG HELD.

Witnesses:
T. B. WAKEMAN,
JULIUS G. SCHWABE.